(12) United States Patent
Bagby (10) Patent No.: US 12,551,054 B2
(45) Date of Patent: Feb. 17, 2026

(54) GRILL MOUNTING APPARATUS

(71) Applicant: Larry Bagby, Adrian, MO (US)

(72) Inventor: Larry Bagby, Adrian, MO (US)

( * ) Notice: Subject to any disclaimer, the term of this patent is extended or adjusted under 35 U.S.C. 154(b) by 38 days.

(21) Appl. No.: 18/615,605

(22) Filed: Mar. 25, 2024

(65) Prior Publication Data

US 2025/0295267 A1 Sep. 25, 2025

(51) Int. Cl.
*A47J 37/07* (2006.01)
*F16M 11/08* (2006.01)

(52) U.S. Cl.
CPC .......... *A47J 37/0786* (2013.01); *F16M 11/08* (2013.01)

(58) Field of Classification Search
CPC .............................. A47J 37/0786; F16M 11/08
USPC .............................. 248/274.1, 229.1, 540, 524
See application file for complete search history.

(56) References Cited

U.S. PATENT DOCUMENTS

| | | | | |
|---|---|---|---|---|
| 2,898,065 | A * | 8/1959 | Ackley | A01K 91/08 248/278.1 |
| D191,186 | S * | 8/1961 | Maki | D7/336 |
| 3,032,783 | A * | 5/1962 | Swanson, Jr. | A47J 37/0786 114/364 |
| D247,661 | S * | 4/1978 | Willard | D7/336 |
| 4,120,476 | A * | 10/1978 | Bourassa | B60R 1/0605 248/480 |
| D259,693 | S * | 6/1981 | Ottmar | D7/336 |
| 4,729,535 | A * | 3/1988 | Frazier | A47J 37/0786 224/406 |
| 5,009,380 | A * | 4/1991 | Fee | F16M 13/022 248/302 |
| 5,039,050 | A * | 8/1991 | Eidschun | B60R 11/04 396/419 |
| 5,082,234 | A * | 1/1992 | Smith | B23Q 9/0064 248/669 |
| 5,310,147 | A * | 5/1994 | Billman | A47J 36/34 248/315 |
| 5,348,241 | A * | 9/1994 | Huette | B65H 49/28 242/129 |
| 5,383,636 | A * | 1/1995 | Karl | F16M 13/022 248/278.1 |
| 5,820,093 | A * | 10/1998 | Murray | B64D 47/00 396/419 |
| 6,520,473 | B2 * | 2/2003 | Lee | F16M 13/02 126/24 |
| 6,718,865 | B1 | 4/2004 | Monteleone | |
| 7,284,549 | B1 * | 10/2007 | Eby | A47J 37/0713 126/25 R |
| 10,737,605 | B1 * | 8/2020 | White | B60R 9/06 |

(Continued)

FOREIGN PATENT DOCUMENTS

WO WO2016168404 10/2016

*Primary Examiner* — Muhammad Ijaz (57) ABSTRACT

A grill mounting apparatus for mounting a grill to a vertically aligned structure includes a frame configured to support a grill, an extension member coupled to and extending away from the frame, a first mounting bracket, and a second mounting bracket. The first and second mounting brackets are configured to attach to a support structure while in vertical alignment with each other such that the extension member extends horizontally away from the support structure. The extension member may be pivotable with respect to the first and second mounting brackets such that the grill is positionable in a variety of positions around the support structure. Securement means may secure the grill in a desired position.

6 Claims, 6 Drawing Sheets

(56) References Cited

U.S. PATENT DOCUMENTS

| | | | |
|---|---|---|---|
| 2014/0339019 A1* | 11/2014 | Hulett | E04G 7/32 |
| | | | 182/113 |
| 2016/0302616 A1* | 10/2016 | Brock | A47J 37/0763 |
| 2020/0199870 A1* | 6/2020 | Chevis | E04G 17/14 |

* cited by examiner

GRILL MOUNTING APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to grill mounting apparatuses and more particularly pertains to a new grill mounting apparatus for mounting a grill to a vertically aligned structure.

(2) Description of Related Art Including Information Disclosed Under 37 CFR 1.97 and 1.98

The prior art relates to grill mounting apparatuses, including those with pivoting elements and which attach a grill to a vertically aligned surface. For example, U.S. Pat. No. 3,032,783 discloses a grill that is pivotally mounted to a side of a boat, but the mechanism described requires mounting brackets to be horizontally spaced from each other on a wall or a ledge. Other grill mounting apparatuses disclosed by the prior art include those which attach over guard rails of boats or other wall structures. But the prior art fails to describe such an apparatus that facilitates mounting a grill to a vertically oriented thin support structure like a pole. The prior art also fails to disclose such an apparatus which facilitates pivoting of the grill with respect to such a support structure.

BRIEF SUMMARY OF THE INVENTION

An embodiment of the disclosure meets the needs presented above by generally comprising a frame configured to support a grill, an extension member coupled to and extending away from the frame, a first mounting bracket, and a second mounting bracket. The first and second mounting brackets are configured to attach to a support structure while in vertical alignment with each other.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 6 thereof, a new grill mounting apparatus embodying the principles and concepts of an embodiment of the disclosure and generally designated by the reference numeral 10 will be described.

As best illustrated in FIGS. 1 through 6, the grill mounting apparatus 10 generally comprises a frame 12 which supports a grill 58. The frame 12 forms a closed loop which defines an aperture 14 therein that is sized to receive the grill 58 therein. The closed loop lies on a plane which is generally horizontal during normal use. The grill 58 shown in the Figures is a kettle-style which has a receptacle 62 for catching ash that protrudes downwardly from a cooking portion 60 of the grill 58. The aperture 14 accommodates grills of this and other styles which have features that protrude downwardly from a cooking portion 60 and may be used to support grills with independent support legs in some cases.

A pair of grill attachment brackets 16 are coupled to the frame 12 and are positioned opposite each other across the aperture 14 of the frame 12. The grill attachment brackets 16 couple to the frame 12 and the grill 58 via threaded fasteners 17, but may couple via weldments, snap fasteners, latches, or any other suitable fastener. The grill 58 may be attached permanently or removably to the frame 12 via a suitable fastener. In some embodiments, the grill 58 may removably rest on the frame 12 during normal use without additional fasteners. A platform 18 is mounted to the frame 12 such that the platform 18 is positioned adjacent to the grill 58 when the grill 58 is supported by the frame 12. The platform 18 is positioned atop the frame 12 and extends over the aperture 14. The platform 18 has an adjacent edge 20 which lies adjacent to the grill 58 during normal use. The adjacent edge 20 is concavely arcuate to conform to the grill 58. The adjacent edge 20 may have other shapes to conform to the shapes of other grills.

An extension member 22 is coupled to and extends away from the frame 12. The extension member 22 is coupled via threaded fasteners 35 but may be attached by weldments, adhesives, clamps, or any other suitable fastener. The extension member 22 comprises a first arm 24 and a second arm 26 which are coupled to each other to form a V-shape. The frame 12 is coupled to a junction of the first and second arms 24, 26. The first arm 24 is oriented coplanar to the frame 12, and the second arm 26 forms an acute angle with the first arm 24. The extension member 22 further comprises a first bearing 32 and a second bearing 34, wherein the first bearing 32 is mounted to a distal end 28 of the first arm 24 with respect to the extension member 22 and the second bearing 34 is mounted to a distal end 30 of the second arm 26 with respect to the extension member 22. The first and second bearings 32, 34 have cylindrical shapes that are coaxially aligned with each other.

The extension member 22 pivotably couples to a first mounting bracket 36 and a second mounting bracket 38. Which are configured to attach to a support structure 64 while in vertical alignment with each other. The first bearing 32 mounts to the first mounting bracket 36, and the second bearing 34 mounts to the second mounting bracket 38. Each one of the first and second mounting brackets 36, 38 comprises a rod 40 and a plate 46 which are coupled to each other. The rod 40 has a proximal portion 42 and a distal portion 44 with respect to the plate 46. The proximal portion 42 is coupled to and extends between the plate 46 and the distal portion 44, and the distal portion 44 is angled with respect to the proximal portion 42 such that the rod 40 forms an L-shape. The first and second bearings 32, 34 mount to the distal portions 44 of the first and second mounting brackets 36, 38.

Figure 1:
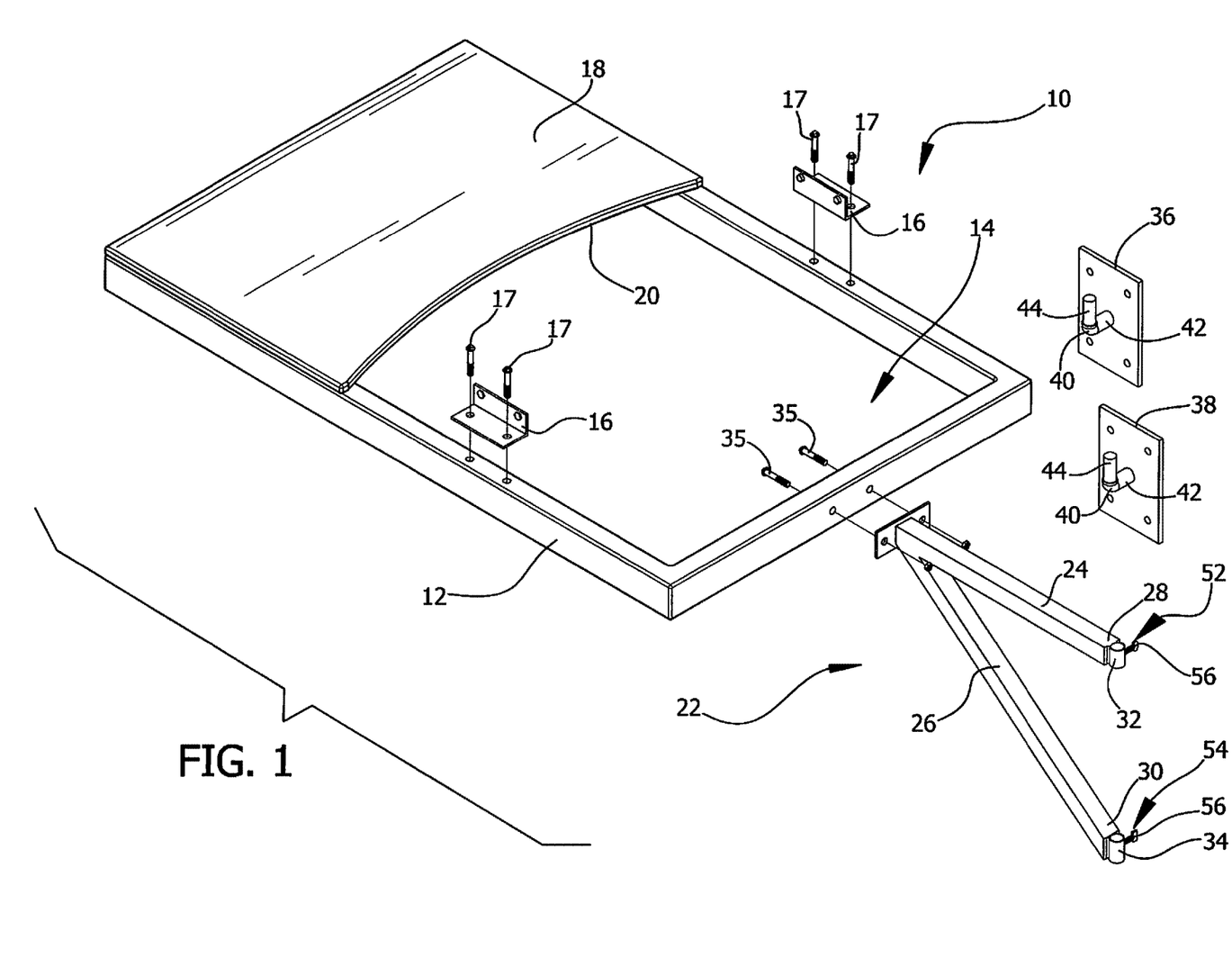
FIG. 1 is an exploded perspective view of a grill mounting apparatus according to an embodiment of the disclosure.
Figure 2:
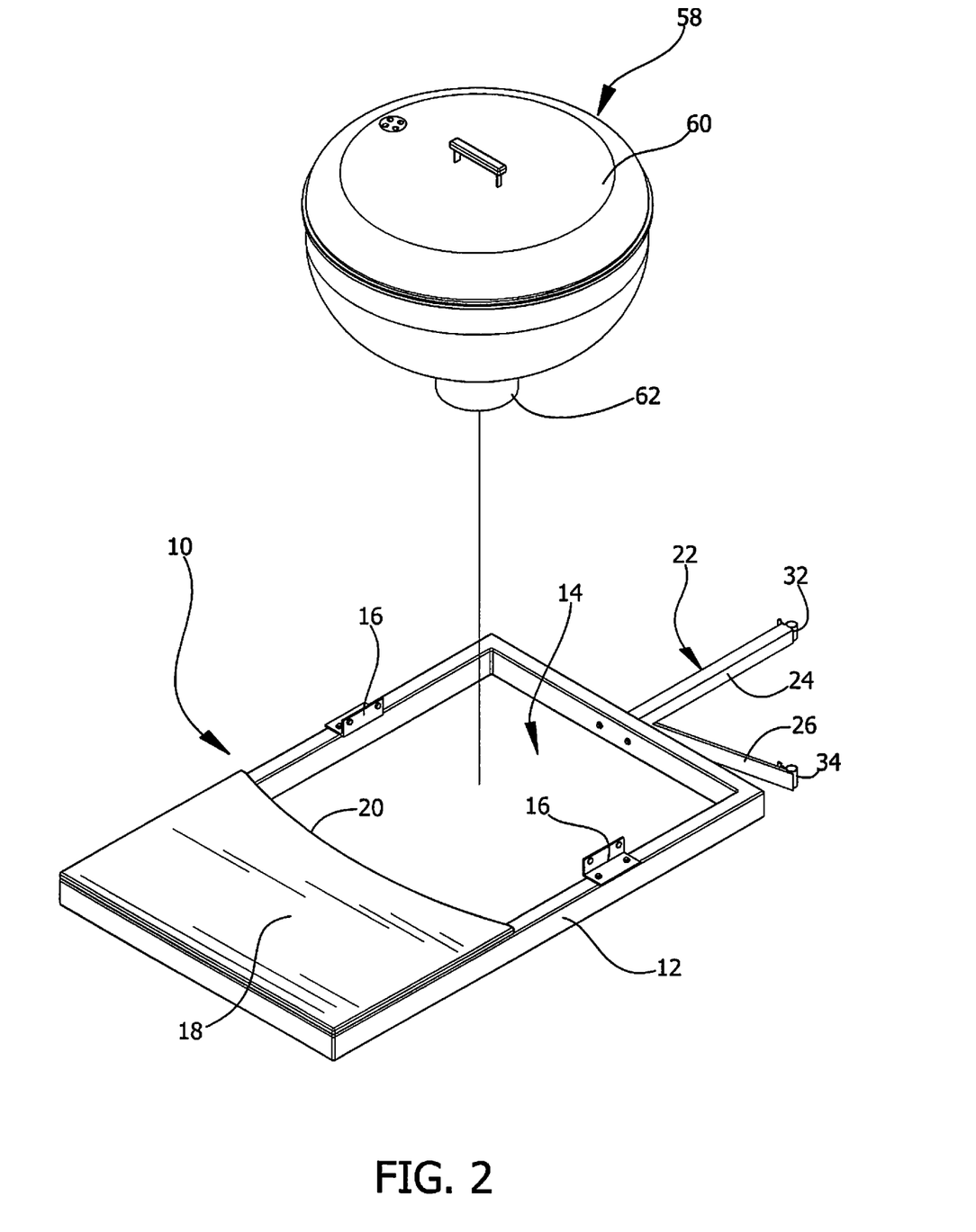
FIG. 2 is a perspective view of an embodiment of the disclosure in-use with a grill in exploded relation to the embodiment.
Figure 3:
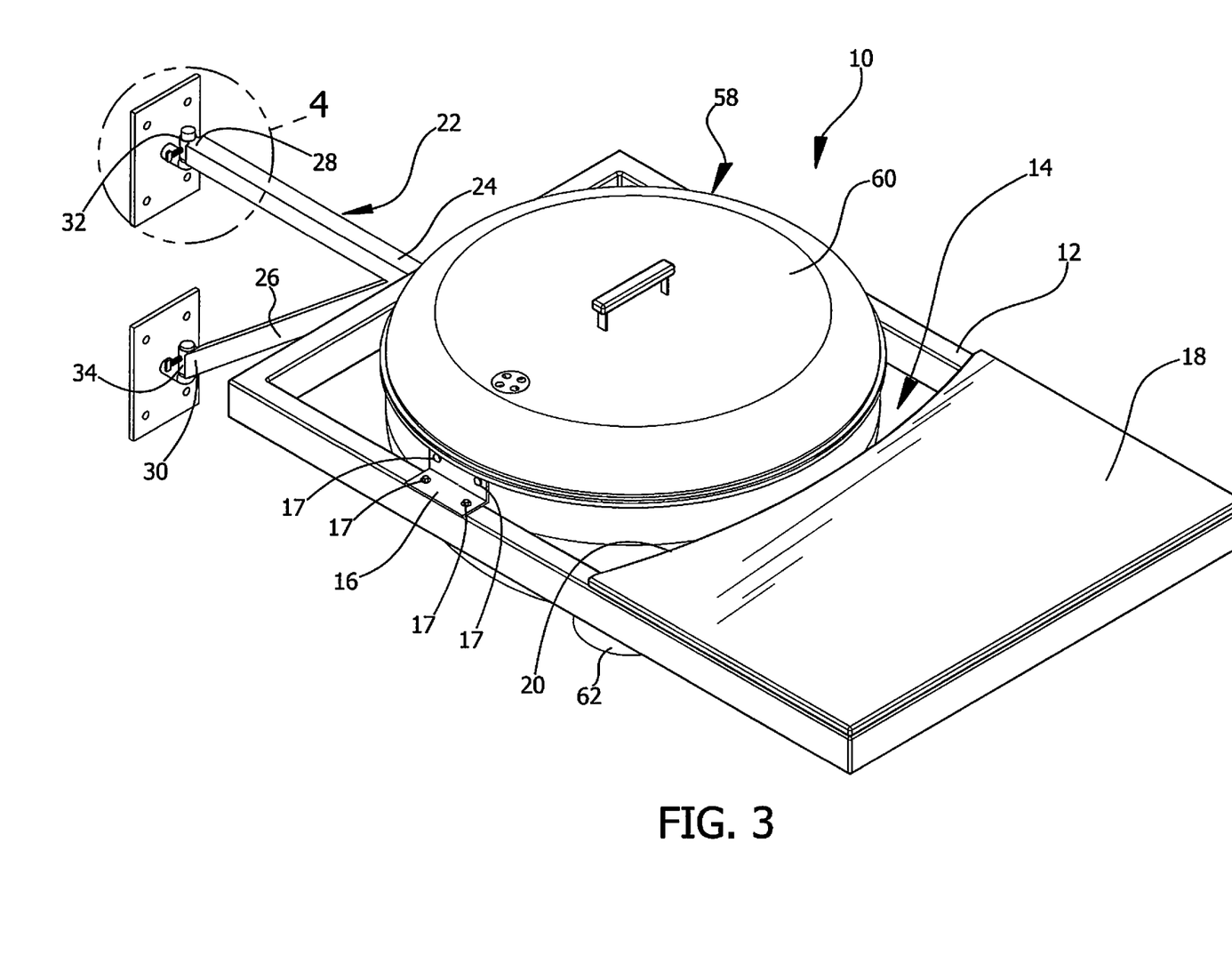
FIG. 3 is a perspective view of an embodiment of the disclosure in use with a grill.
Figure 4:
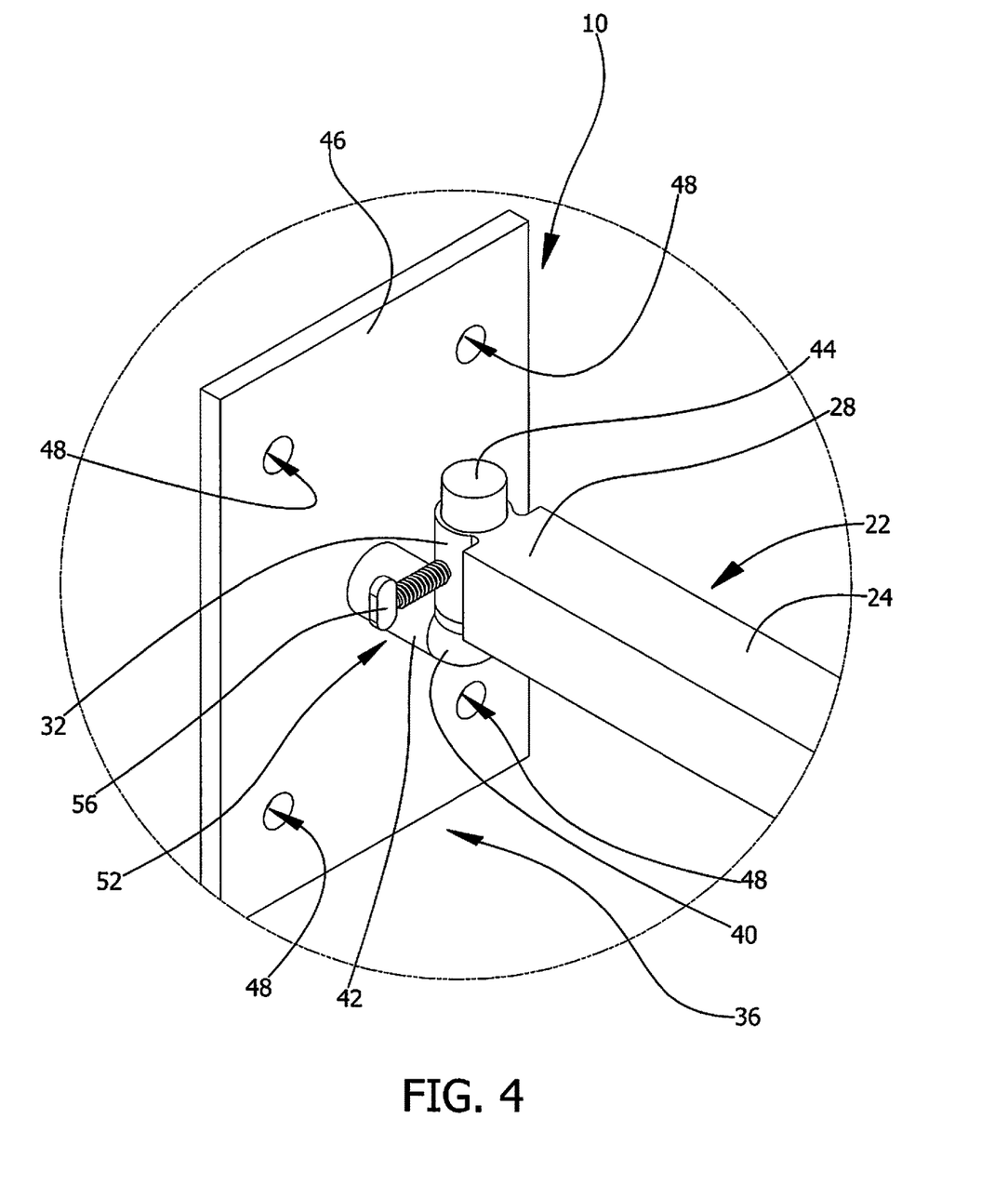
FIG. 4 is a detail view of an embodiment of the disclosure taken from Window 4 in FIG. 3.
Figure 5:
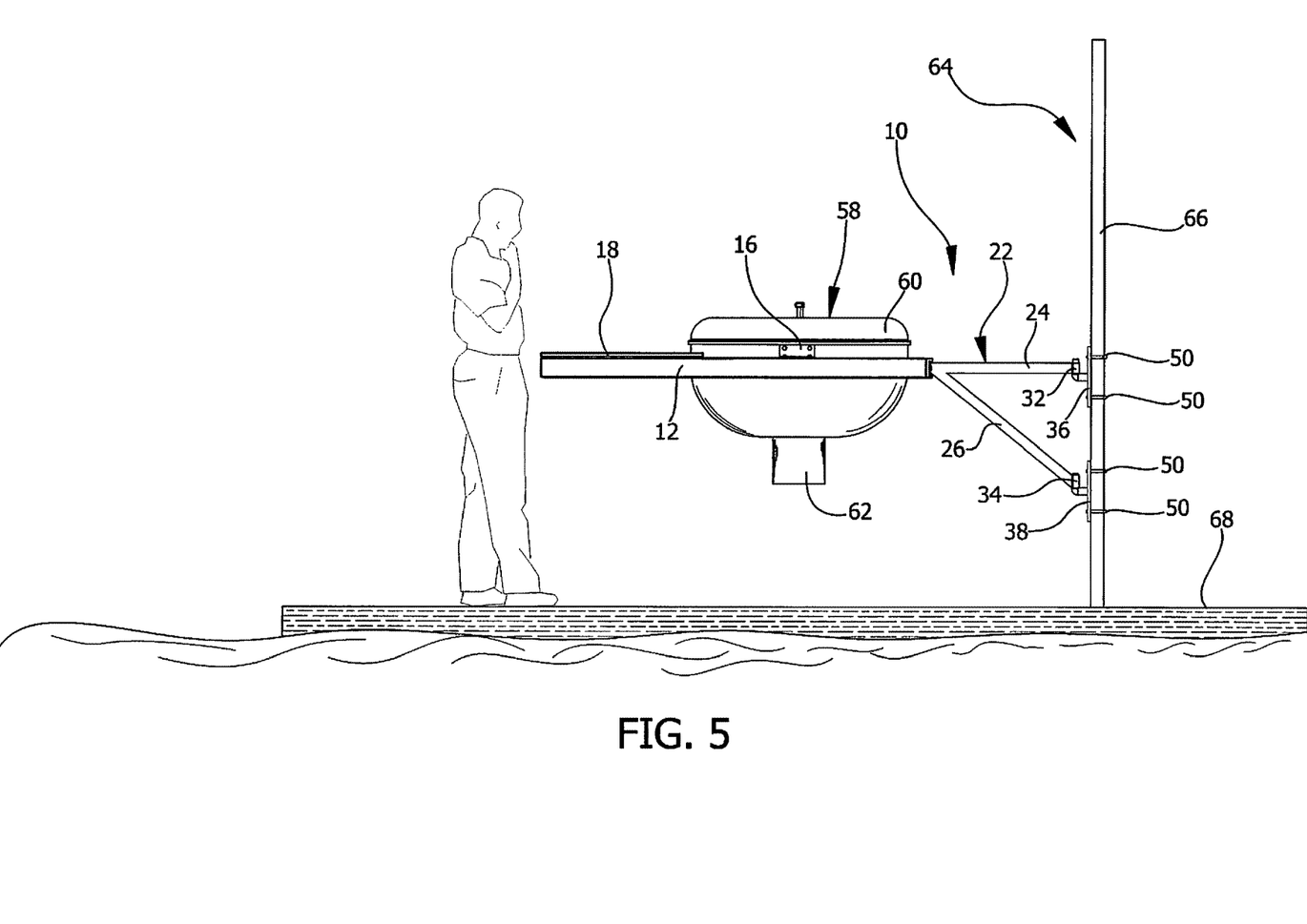
FIG. 5 is a side view of an embodiment of the disclosure in-use with a grill and a support structure.
Figure 6:
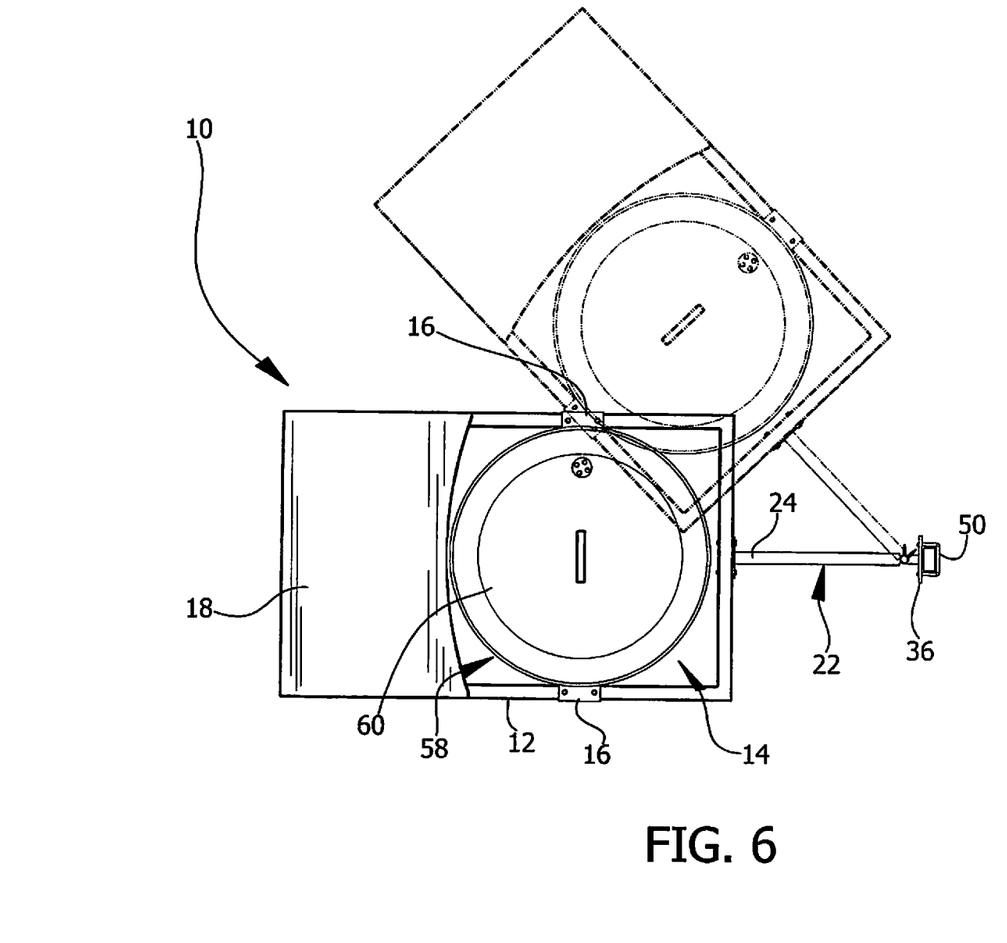
FIG. 6 is a top view of an embodiment of the disclosure.

The plates 46 of the first and second mounting brackets 36, 38 define a plurality of mounting holes 48 such that the first and second mounting brackets 36, 38 may attach to the support structure 64 via threaded fasteners. With reference to FIG. 5, the plates 46 of the first and second mounting brackets 36, 38 attach to a pole 66 on a dock 68 by clamping to the pole 66 using U-bolts 50 that extend through the mounting holes 48 of the plates 46. The first and second mounting brackets 36, 38 may also mount to a wall or other structures via screws or other threaded fasteners which penetrate the wall. The first and second mounting brackets 36, 38 also may be welded, adhered, or otherwise attached to a support structure 64 via suitable means.

A first position lock 52 and a second position lock 54 are provided for securing the frame 12 with respect to the support structure 64. The first and second position locks 52, 54 comprise set screws 56 which threadedly engage the first and second bearings 32, 34 respectively to be selectively urged against the first and second mounting brackets 36, 38 respectively and lock the frame 12 with respect to the support structure 64. In other embodiments, the first and second position locks 52, 54 may be detents, locking pins, or any other suitable securement means.

In use, the grill 58 is mounted to the frame 12 via threaded fasteners 17 extending through the grill mounting brackets, thereby securing the grill 58 in the aperture 14 of the frame 12. The first and second bearings 32, 34 are mounted onto the distal portions 44 of the rods 40 of the first and second mounting brackets 36, 38 by receiving the distal portions 44 therein. The first and second mounting brackets 36, 38 are attached to the support structure 64. The grill 58 may be locked into a desired position via the first and second position locks 52, 54. To move the grill 58 to another position, the grill 58 and the frame 12 are pivoted via the extension member 22 around the support structure 64 to the other position after the first and second position locks 52, 54 are disengaged. The platform 18 may be used to support food, cooking utensils, and other paraphernalia.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A grill mounting apparatus comprising:

a frame configured to support a grill;

an extension member coupled to and extending away from the frame;

a first mounting bracket and a second mounting bracket, the first and second mounting brackets being configured to attach to a support structure while in vertical alignment with each other;

wherein the frame defines an aperture therein, the aperture being sized and configured to receive the grill therein;

wherein the frame forms a closed loop which surrounds the aperture, the closed loop lying on a plane;

wherein the extension member comprises a first arm and a second arm, the first and second arms being coupled to each other and forming a V-shape, the frame being coupled to a junction of the first and second arms, the first arm being oriented coplanar to the frame, the second arm forming an acute angle with the first arm, the first arm being couplable to the first mounting bracket, the second arm being couplable to the second mounting bracket;

wherein the extension member is pivotable with respect to the first and second mounting brackets;

wherein the extension member further comprises a first bearing and a second bearing, the first bearing being mounted to a distal end of the first arm with respect to the extension member, the second bearing being mounted to a distal end of the second arm with respect to the extension member, the first and second bearings having cylindrical shapes, the first and second bearings being coaxially aligned with each other; and wherein each one of the first and second mounting brackets comprises a rod and a plate which are coupled to each other, the rod having a proximal portion and a distal portion with respect to the plate, the proximal portion being coupled to and extending between the plate and the distal portion, the distal portion being angled with respect to the proximal portion such that the rod forms an L-shape, the plate defining a plurality of mounting holes.

2. The apparatus of claim 1, further comprising a position lock engageable to secure the frame relative to the first and second mounting brackets.

3. The apparatus of claim 2, wherein the position lock is engageable with the extension member and one of the first and second mounting brackets to secure the frame, the position lock comprising a set screw.

4. The apparatus of claim 1, further comprising a pair of grill attachment brackets coupled to the frame and configured to couple to the grill, the grill attachment brackets being positioned opposite each other across the aperture of the frame.

5. The apparatus of claim 1, further comprising a platform mounted to the frame, the platform being configured to be adjacent to the grill when the frame supports the grill during normal use.

6. A grill mounting apparatus comprising:
- a frame configured to support a grill, the frame defining an aperture therein, the aperture being sized and configured to receive the grill therein, the frame forming a closed loop which surrounds the aperture, the closed loop lying on a plane;
- an extension member coupled to and extending away from the frame, the extension member comprising a first arm and a second arm, the first and second arms being coupled to each other and forming a V-shape, the frame being coupled to a junction of the first and second arms, the first arm being oriented coplanar to the frame, the second arm forming an acute angle with the first arm, the extension member further comprising a first bearing and a second bearing, the first bearing being mounted to a distal end of the first arm with respect to the extension member, the second bearing being mounted to a distal end of the second arm with respect to the extension member, the first and second bearings having cylindrical shapes, the first and second bearings being coaxially aligned with each other;
- a first mounting bracket and a second mounting bracket, the first and second mounting brackets being configured to attach to a support structure while in vertical alignment with each other, the extension member being pivotably couplable to the first and second mounting brackets, the first bearing being couplable to the first mounting bracket and the second bearing being couplable to the second mounting bracket, each one of the first and second mounting brackets comprising a rod and a plate which are coupled to each other, the rod having a proximal portion and a distal portion with respect to the plate, the proximal portion being coupled to and extending between the plate and the distal portion, the distal portion being angled with respect to the proximal portion such that the rod forms an L-shape, the plate defining a plurality of mounting holes;
- a first position lock and a second position lock, the first position lock being engageable with the first bearing and the first mounting bracket and the second position lock being engageable with the second bearing and the second mounting to secure the frame relative to the first mounting bracket, each of the first position lock and the second position lock comprising a set screw;
- a pair of grill attachment brackets coupled to the frame and configured to couple to the grill, the grill attachment brackets being positioned opposite each other across the aperture of the frame; and
- a platform mounted to the frame, the platform being configured to be adjacent to the grill when the frame supports the grill during normal use.

* * * * *